United States Patent
Berndt et al.

(10) Patent No.: US 6,588,191 B2
(45) Date of Patent: Jul. 8, 2003

(54) METHOD FOR PROVIDING GROOVED ROLLER WITH VARIABLE SHOULDERS

(75) Inventors: Dennis J. Berndt, Eagan, MN (US); Scott M. Coffin, Plymouth, MN (US); David S. Klis, Plymouth, MN (US); Richard M. Olson, Eden Prairie, MN (US); Gerald J. Pomerening, Farmington, MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 09/915,176

(22) Filed: Jul. 25, 2001

(65) Prior Publication Data

US 2003/0019195 A1 Jan. 30, 2003

(51) Int. Cl.[7] ............................. A01D 34/42; A01G 1/12
(52) U.S. Cl. ..................... 56/249; 404/124; 404/131
(58) Field of Search ..................... 56/6, 7, 14.7, 249; 404/122, 124, 127, 128, 131

(56) References Cited

U.S. PATENT DOCUMENTS

| 1,155,304 | A | * | 9/1915 | Dunham | 404/122 |
|---|---|---|---|---|---|
| 2,315,397 | A | * | 3/1943 | Butler | 172/247 |
| 3,662,528 | A | * | 5/1972 | Akgulian et al. | 56/249 |
| 4,632,599 | A | * | 12/1986 | Sadahiro | 404/121 |
| 5,394,681 | A | * | 3/1995 | Nolan et al. | 56/249 |
| 5,511,901 | A | * | 4/1996 | Yates | 404/124 |
| 5,829,235 | A | * | 11/1998 | Rice et al. | 56/249 |
| 6,131,377 | A | * | 10/2000 | Rice et al. | 56/249 |
| 6,390,204 | B1 | * | 5/2002 | Schafle | 172/554 |

OTHER PUBLICATIONS

Golfco Competition Rollers Pricebook dated 1999.
Ruland Catalog, pp. 5–7, dated 1998.

* cited by examiner

Primary Examiner—Robert E. Pezzuto
Assistant Examiner—Nathan Mammen
(74) Attorney, Agent, or Firm—James W. Miller

(57) ABSTRACT

A plurality of annular collars are provided formed from collar halves. The collar halves are at least partially separable from one another to allow the collar halves to be slipped into and around a groove in a grooved roller for a reel-type cutting unit. The collar halves can then be abutted and secured together to substantially fill in the roller groove. When collars are placed into the last two or three grooves on each end of a grooved roller, a non-shouldered grooved roller is thereby converted into a shouldered grooved roller without having to remove and replace one set of rollers with another.

12 Claims, 4 Drawing Sheets

METHOD FOR PROVIDING GROOVED ROLLER WITH VARIABLE SHOULDERS

TECHNICAL FIELD

This invention relates to grooved rollers used on reel type cutting units.

BACKGROUND OF THE INVENTION

Reel type cutting units are well known for cutting grass. Many such cutting units in common use today are attached to the frame of a self-propelled riding mower. Such cutting units comprise a frame which carries a transversely extending reel and a bedknife adjacent a lower portion of the reel. The cutting unit frame often includes front and rear rollers that engage the ground to allow the cutting unit to roll over the ground as the mower operates.

The front roller in many reel type cutting units often comprises a grooved roller. Various versions of this grooved roller have been provided in the art. In one "non-shouldered" version, the grooves extend over substantially the entire length of the roller. In another "shouldered" version, the last two or three grooves on each end of the roller are substantially filled in by additional material cast into the roller when the roller is manufactured.

Reel type cutting units are usually equipped with non-shouldered grooved rollers. However, when cutting grass in certain conditions, the cut grass swath sometimes exhibits visually objectionable longitudinal stripes in the areas where trailing cutting units overlap leading cutting units. If this happens, the solution in the art for getting rid of such overlap stripes is to replace the non-shouldered grooved rollers on the cutting units with shouldered grooved rollers. With this change, the grooved rollers now have shoulders in the overlap areas. Thus, the cutting efficiency in the overlap areas is reduced so that the appearance of the cut grass in the overlap areas better matches the appearance of the cut grass in the rest of the cut grass swath even though the grass has been cut twice in the overlap areas, namely by both the leading and following cutting units, rather than once in the rest of the cut grass swath.

One problem with using different versions of grooved rollers, namely both a shouldered and a non-shouldered version, is the need to purchase and have on hand both types of rollers. Another problem is the need to replace one version of the grooved roller with another version when cutting conditions would normally indicate the desirability of such a change. It is labor intensive and time consuming to replace one set of rollers with another set of rollers, particularly since many of the other operational characteristics of the cutting unit, such as reel to bedknife clearance or height of cut, will have to be reset or readjusted after a roller change. Accordingly, many operators of this type of equipment might simply not make the change in rollers with the result that performance of the mower in the particular cutting conditions being encountered is not optimized.

SUMMARY OF THE INVENTION

One aspect of this invention relates to a method of providing a reel type cutting unit with grooved rollers having variable shoulder configurations. The method comprises providing a non-shouldered grooved roller on the reel type cutting unit. The method further comprises selectively providing a shoulder on the grooved roller without removing the grooved roller from the reel type cutting unit.

One aspect of this invention relates to a method of converting a non-shouldered grooved roller for a reel type cutting unit of a mower for mowing grass to a shouldered grooved roller. The method comprises providing a plurality of annular groove inserts, each insert being sized to substantially fill in one groove on the roller. The method further comprises selectively installing a groove insert in at least one groove on at least one end of the roller to provide a shoulder on at least one end of the roller.

Another aspect of this invention relates to apparatus for practicing the above noted method. The apparatus comprises a plurality of annular groove inserts. Each insert is sized to substantially fill in one groove on the roller.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
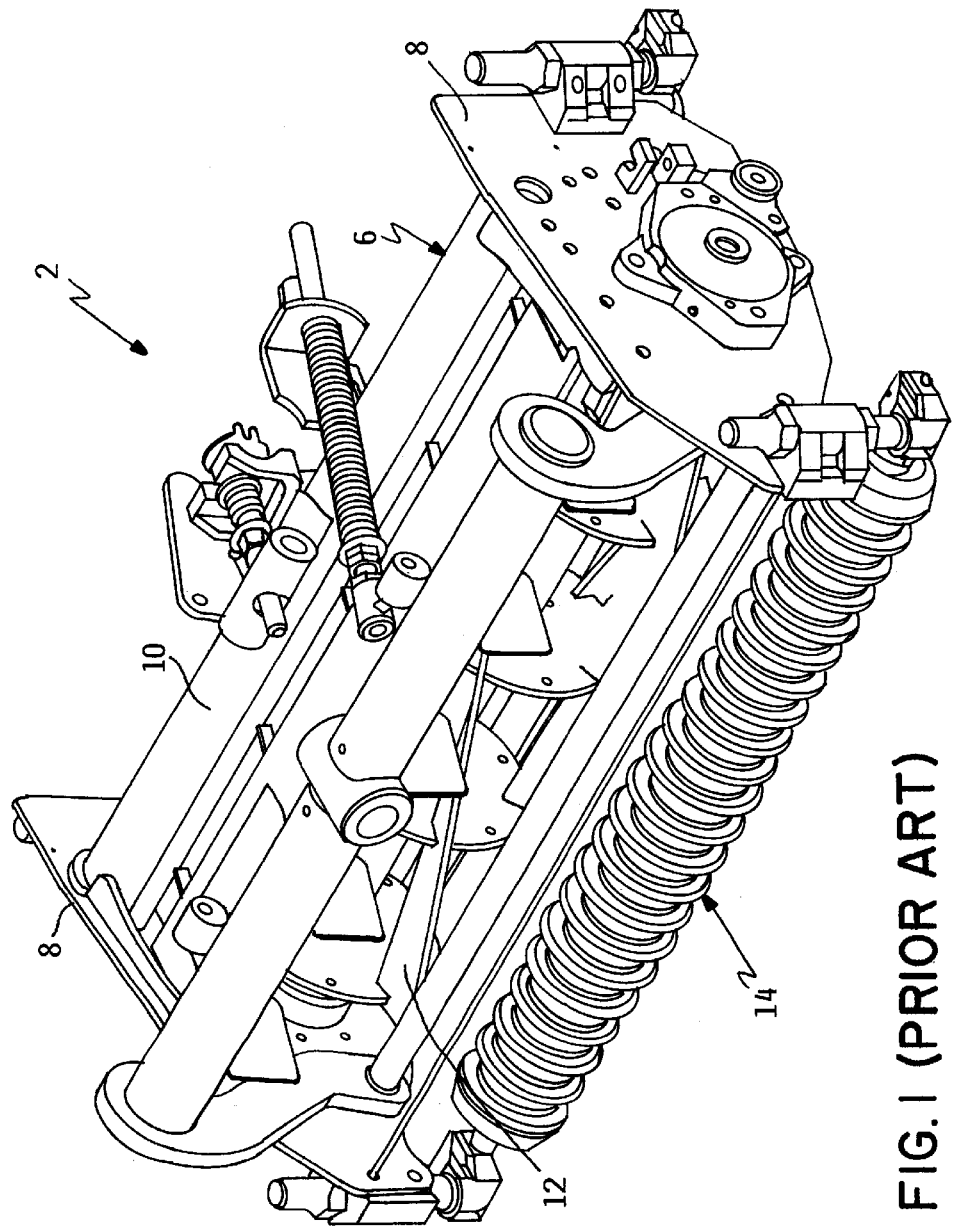
FIG. 1 is a perspective view of a prior art, reel type cutting unit having a front grooved roller.

Referring first to FIG. 1, a typical reel type cutting unit 2 of the type found in the prior art is shown. Cutting unit 2 includes a cutting unit frame 6 that has a pair of side plates 8 joined together by cross members 10. A transversely extending reel 12 is rotatably journaled between side plates 8 and rotates about a horizontal axis. Reel 12 sweeps grass against a sharpened bedknife (not shown) that sits below reel 12 to cut grass.

Cutting unit 2 rolls over the ground by virtue of front and rear rollers. The front roller 14 often is a grooved roller as shown in FIG. 1. The rear roller (not shown) often is a solid roller. Cutting unit 2 is typically attached to a mower (not shown) by a linkage (not shown) that permits cutting unit 2 to pitch, roll and yaw to conform to the contours of the ground when cutting. This linkage includes a lift and lower mechanism that permits cutting unit 2 to be raised out of contact with the ground when desired.

Figure 3:
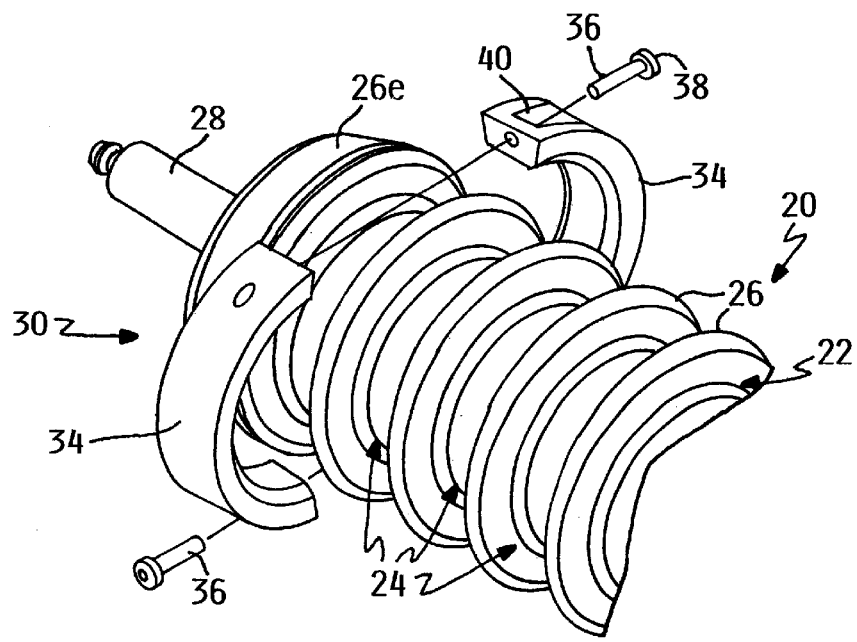
FIG. 3 is an exploded perspective view of a groove insert according to this invention, particularly showing the groove insert prior to such insert having been installed in a groove in a grooved roller for a reel type cutting unit.

FIG. 3 illustrates one end of a prior art, non-shouldered grooved roller 20. Such a roller 20 includes a roller body 22 having a plurality of grooves 24 defined by the spaces between a series of transversely spaced annular ribs 26. Each end of roller body 22 also includes a thicker end rib 26e that tapers radially inwardly as it extends outwardly, namely the diameter of end rib 26e decreases from the inside of end rib 26e towards the outside of end rib 26e. The largest diameter of end rib 26e at the inside of end rib 26e matches the diameter of all the other ribs 26, which diameter determines the nominal diameter of grooved roller 20. As can be seen in FIG. 3, grooves 24 defined between ribs 26 extend over substantially the entire length of roller body 22. Roller 20 usually includes a through shaft 28 that supports roller body 22 on cutting unit frame 6.

Various ways are known in the art to manufacture grooved rollers 20 of the type shown in FIG. 3. In one method, roller body 22 is cast or machined as a solid, integral piece. Roller body 22 is then supported by bearings on through shaft 28 and through shaft 28 is fixed to cutting unit frame 6, roller body 22 rotating relative to through shaft 28 by virtue of the bearings. Alternatively, roller body 22 could be fixed to through shaft 28 with the ends of through shaft 28 rotatably supported in bearings in side plates 8 of cutting unit frame 6, such that through shaft 28 and roller body 22 rotate together. In yet another method, roller body 22 is not made as an integral piece, but is built up from a series of annular discs forming ribs 26 with the discs being separated by cylindrical spacers, the spacers forming grooves 24. The precise way in which grooved roller 20 is manufactured is not important to this invention.

Figure 2:
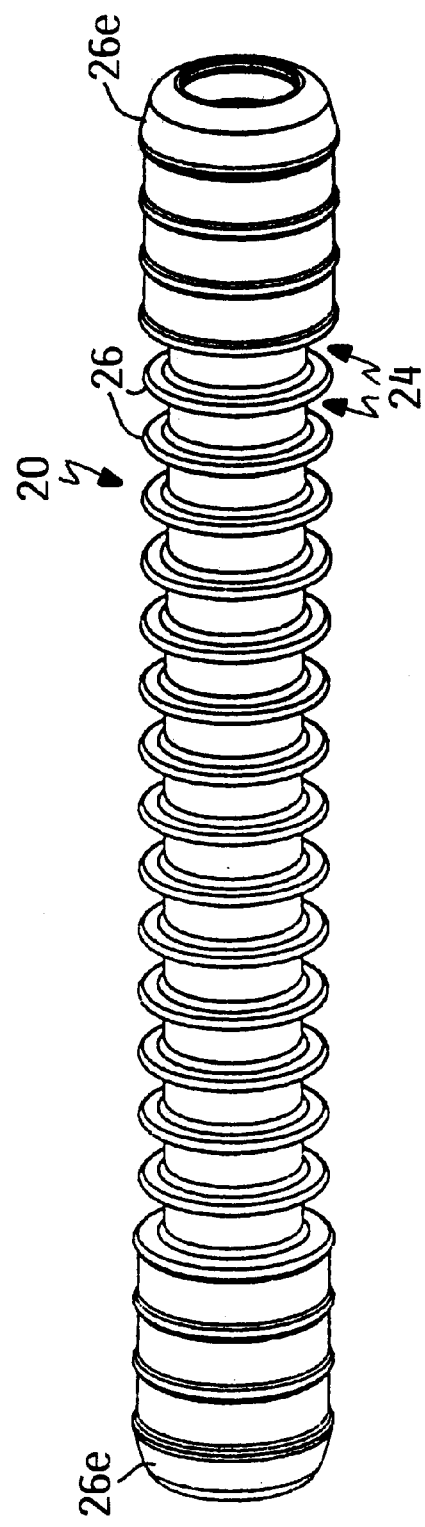
FIG. 2 is a perspective view of a prior art, shouldered version of a roller body used as part of a front grooved roller for a reel type cutting unit.

FIG. 2 illustrates roller body 22 of a prior art, shouldered grooved roller 20. In this roller, the last few grooves 24 on each end of roller body 22 are substantially, though usually not completely, filled in by additional material cast into roller body 22 when roller body 22 is manufactured. This additional material substantially fills in the depth of grooves 24. These filled in grooves 24 give roller body 22 the appearance of having solid shoulders at each end, thus giving rise to the terminology of a shouldered roller versus a non-shouldered roller. As is well known in the mowing art, certain grass conditions indicate that shouldered rollers should be used on cutting units 2 attached to mower 4, rather than non-shouldered rollers, to get rid of or minimize overlap striping in the cut grass swath, as discussed more fully in the Background of the Invention section of this patent application.

Referring now to FIGS. 3 and 2, this invention relates to an apparatus and a method for converting an existing non-shouldered roller 20 on a reel type cutting unit into a shouldered roller 20. A plurality of annular groove inserts 30 are provided each of which can be individually installed in a selected groove 24 of roller 20. When so installed, groove inserts 30 substantially fill in groove 24 of roller 20, just as the additional cast material did in the prior art grooved roller of FIG. 2. However, unlike roller 20 of FIG. 2, the annular groove inserts 30 are not a permanent part of roller 20, but can be installed and removed at will. When annular groove inserts 30 are used in the last two or three grooves 24 on each end of roller 20, then an existing non-shouldered roller is converted into a shouldered roller.

The term to "substantially fill in" a roller groove 24 includes a condition in which the outer diameter of groove insert 30 slightly exceeds the outer diameter of roller 20 as well as a condition in which groove insert 30 has a diameter which is slightly smaller than the outer diameter of roller 20. Which type of groove insert is used depends on grass conditions and the type of grass being cut. When Bermuda grass is cut, a groove insert 30 which is either flush with or having a diameter slightly larger (i.e. up to 0.125 inches larger) than the outer diameter of roller 20 can be used. When Northern grasses are being cut, a groove insert 30 having a diameter slightly smaller (i.e. up to 0.25 inches smaller) than the outer diameter of roller 20 is preferably used.

One embodiment of an annular groove insert 30 according to this invention comprises an annular collar 32 that is made from separate semi-circular collar halves 34. As shown in FIG. 3, each collar half 34 fits within one half of one groove 24 of roller 20. When collar halves 34 are thus placed into opposite halves of roller groove 24 and then brought towards one another until they abut, collar halves 34 will then form a completed annular collar 32 filling in groove 24. Machine screws 36 can then be used to clamp collar halves 34 together around each half of groove 24. The head 38 of each machine screw 36 is received within a recess 40 in the outside surface of each collar half 34 so that head 38 of machine screw 36 will not protrude outwardly through the outside surface of collar half 34 when machine screw 36 is fully screwed or tightened into the other collar half 34. Collar halves 34 are preferably formed of a relatively rigid plastic or metallic material.

Figure 4:
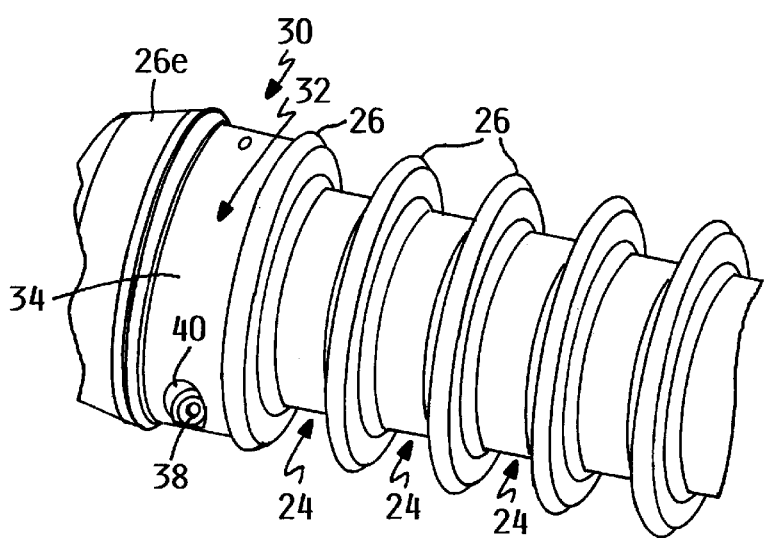
FIG. 4 is an assembled perspective view of a groove insert according to this invention, particularly showing the groove insert installed in a groove in a grooved roller for a reel type cutting unit.

FIG. 3 illustrates collar halves 34 that form annular collar 32 described above prior to such collar halves 34 being installed in the outermost groove 24 on one end of roller 20. FIG. 4 depicts the same collar halves 34 after such collar halves 34 have been installed in this groove and have been joined together by tightening machine screws 36. While only one annular collar 34 has been shown installed in only one groove 24 of roller 20, usually the last two or three grooves 24 on each end of roller 20 will receive these annular collars 32 so that a shouldered roller 20 having much the same external appearance as that shown in FIG. 2 will result. The installation of these additional collars 32 in the additional grooves 24 has simply not been shown in FIGS. 3 and 4 for the sake of clarity.

Groove inserts 30 of this invention provide various advantages over the prior art. For example, the user need only purchase one set of rollers, namely a set of non-shouldered grooved rollers 20, for each mower 4 having reel type cutting units 2. If grass conditions indicate the desirability of switching from a non-shouldered grooved roller to a shouldered grooved roller, the user need only install groove inserts 30 in the outermost grooves 24 on each end of roller 20 that the user already owns. Thus, there is no need to stock multiple sets of rollers simply to provide grooved rollers having shoulders.

Another advantage of this invention is that the conversion of an existing non-shouldered grooved roller to a shouldered grooved roller can be done in situ with roller 20 installed on cutting unit 2. All the operator need do is to raise cutting unit 2 on mower 4 until cutting unit 2 is clear of the ground using the existing lift and lower mechanism on cutting unit 2. When grooved roller 20 is clear of the ground, the user can then install and remove as many annular collars 32 in as many grooves 24 as might be desired without ever removing roller 20 from cutting unit 2. Thus, the time-consuming procedure of entirely removing one roller from cutting unit 2 and replacing it with another alternate roller and of then having to reset or readjust cutting unit 2 is avoided. It is easy and quick to install annular groove inserts 30 of this invention.

An alternative to the use of an annular collar 32 formed by two separate collar halves 34 would be an annular collar 32 formed in a clamshell fashion (not shown). In this embodiment, collar halves 34 would be pinned together at one end so that collar halves 34 could be swung open and closed in the manner of a clamshell. The hinge could be molded as part of collar halves 34. With collar halves 34 pivoted open, the halves could be installed in a groove of roller 20. Then, collar halves 34 would be pivoted to a closed position in which the other side of collar halves 34 abut with one another. A single machine screw 36 would then clamp that side of collar halves 34 together.

Figure 5:
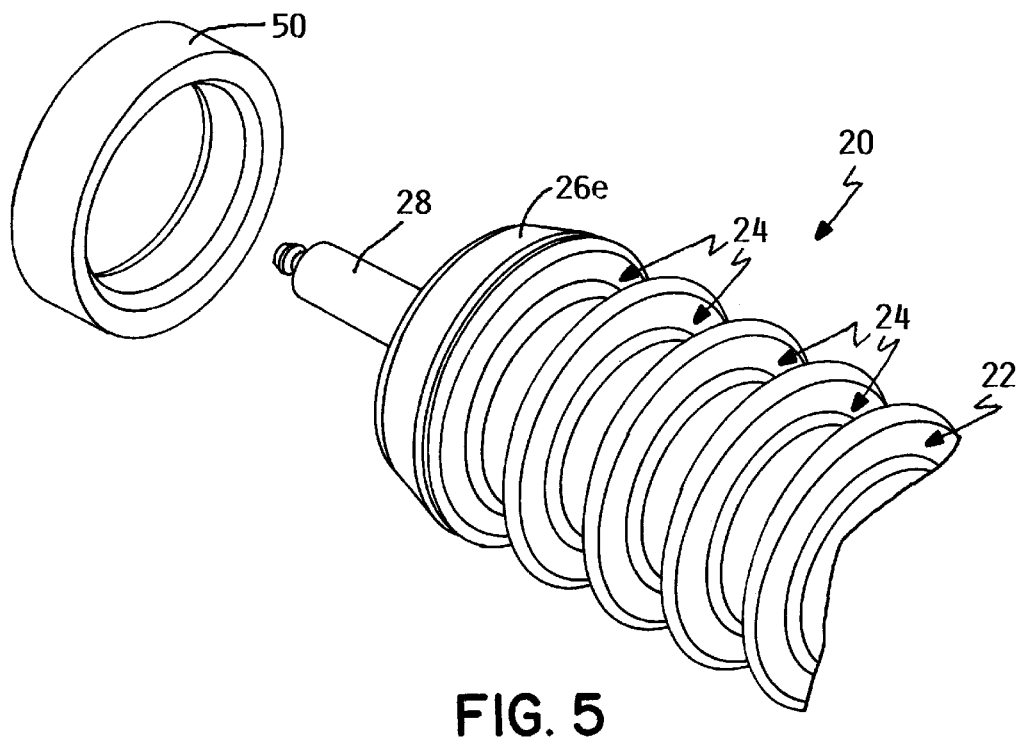
FIG. 5 is an exploded perspective view of an alternative groove insert according to this invention, particularly showing the groove insert prior to such insert having been installed in a groove in a grooved roller for a reel type cutting unit.
Figure 6:
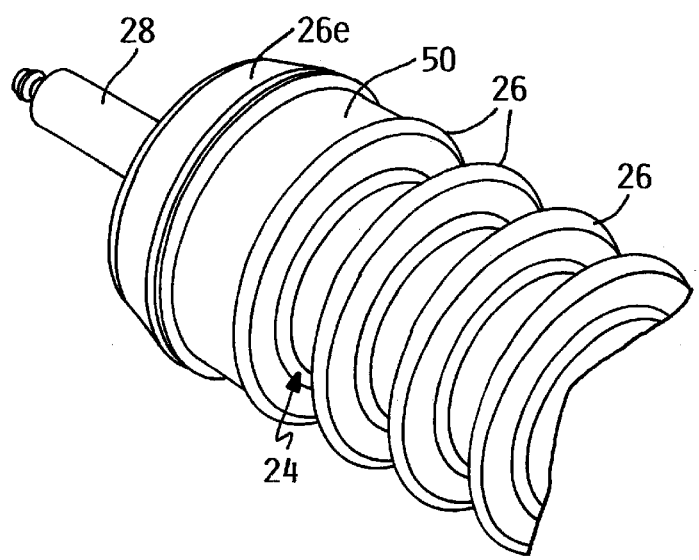
FIG. 6 is an assembled perspective view of the alternative groove insert shown in FIG. 5, particularly showing the groove insert installed in a groove in a grooved roller for a reel type cutting unit.

Yet another alternative to the use of an annular collar 32 formed by separable collar halves, whether such collar halves 34 be formed as entirely separate halves or as a clamshell as just described, would be to use an expandable, doughnut shaped resilient ring 50 as groove insert 30. The ring 50 could be expanded to allow the ring to be slipped over one end of roller 20, as shown in FIG. 5, until the ring is received in a groove, at which point the bias of the ring would return the ring to a contracted state tightly gripping groove 24 as shown in FIG. 6. Multiple rings 50 would be provided for installation in multiple grooves of roller 20.

While use of a circular rubber ring as a groove insert would fall within the overall scope of this invention, such a ring is not preferred to the use of a collar 32 made from collar halves 34. Such a ring cannot be installed in situ on a roller as one must have access to one end of roller 20 for allowing the ring to slipped over roller 20 in order to install it. Thus, roller 20 must be disconnected from cutting unit 2 to install such a ring. This is thought to be less desirable than using collars 32 which can be installed and removed from roller 20 without ever removing roller 20 from cutting unit 2.

Various other modifications will be apparent to those skilled in the art. For example, while the use of groove inserts 30 on each end of roller 20 would be normally preferred, it would be possible to sometimes use groove inserts 30 only on one end of roller 20. For example, when using groove inserts to reduce the striping effect from overlapped cutting units, groove inserts 30 could be used only on the overlapping ends of rollers 20 on the cutting units. Thus, this invention is to be limited only by the appended claims.

We claim:

1. A method of providing a reel type cutting unit with grooved rollers having variable shoulder configurations, which comprises:

(a) providing a non-shouldered grooved roller on the reel type cutting unit; and (b) selectively providing a shoulder on the grooved roller without removing the grooved roller from the reel type cutting unit.

2. The method of claim 1, wherein the shoulder installing step comprises selectively installing an annular groove insert in at least one groove on at least one end of the roller to provide a shoulder on at least one end of the roller.

3. The method of claim 2, wherein the shoulder installing step comprises selectively installing an annular groove insert in at least one groove on each end of the roller to provide a shoulder on each end of the roller.

4. A method of converting a non-shouldered grooved roller for a reel type cutting unit of a mower for mowing grass to a shouldered grooved roller, which comprises:

(a) providing a plurality of annular groove inserts, each insert being sized to substantially fill in one groove on the roller; and (b) selectively installing a groove insert in at least one groove on at least one end of the roller to provide a shoulder on at least one end of the roller.

5. The method of claim 4, wherein the step of selectively installing comprises selectively installing a groove insert in at least a last groove on at least one end of the roller.

6. The method of claim 4, wherein the step of selectively installing comprises selectively installing a plurality of groove inserts in a plurality of adjacent grooves on at least one end of the roller.

7. The method of claim 6, wherein the step of selectively installing comprises selectively installing a plurality of groove inserts in a plurality of adjacent grooves on at least one end of the roller which plurality match an overlap area between staggered, overlapped cutting units.

8. The method of claim 4, wherein the step of providing a plurality of annular groove inserts comprises providing a plurality of annular collars formed of collar halves which are at least partially separable from one another and when so separated can be fit into and around one groove on the roller, the collar halves further including at least one attachment member for securing the collar halves together after the collar halves are fit into and around one groove of the roller, and wherein the step of selectively installing a groove insert comprises the steps of at least partially separating the collar halves, fitting the at least partially separated collar halves into and around one groove of the roller, closing the at least partially separated collar halves, and securing the collar halves together using the at least one attachment member.

9. The method of claim 8, wherein the collar halves are completely separable from each other to be disconnected from one another when separated, the collar halves being fit into one groove of the roller by placing the collar halves into opposite halves of the roller groove and moving the collar halves towards one another until the ends of the collar halves abut and mate with one another, and wherein the step of securing the collar halves together includes securing the abutting mating ends of the collar halves to one another using attachment members at the abutting mating ends.

10. The method of claim 9, wherein the attachment members comprise threaded attachment members.

11. The method of claim 4, wherein the step of selectively installing comprises selectively installing a groove insert in at least one groove on each end of the roller to provide a shoulder on each end of the roller.

12. The method of claim 4, wherein the step of providing a plurality of annular groove inserts comprises providing a plurality of annular, expandable, doughnut shaped resilient rings, wherein each ring can be expanded to allow the ring to be slipped over one end of the roller until the ring overlies one groove on the roller at which point the ring is allowed to return to a contracted state gripping the groove.

* * * * *